(12) United States Patent
Frost

(10) Patent No.: US 8,419,948 B2
(45) Date of Patent: Apr. 16, 2013

(54) WASTEWATER TREATMENT

(75) Inventor: Jack G. Frost, Duncan, OK (US)

(73) Assignee: United Laboratories International, LLC, Houston, TX (US)

( * ) Notice: Subject to any disclaimer, the term of this patent is extended or adjusted under 35 U.S.C. 154(b) by 275 days.

(21) Appl. No.: 12/623,435

(22) Filed: Nov. 22, 2009

(65) Prior Publication Data

US 2011/0120958 A1    May 26, 2011

(51) Int. Cl.
*C02F 1/68* (2006.01)
(52) U.S. Cl.
USPC ............ 210/763; 210/766; 210/908; 210/910
(58) Field of Classification Search .................. 210/757, 210/758, 763, 766, 908, 910; 422/30
See application file for complete search history.

(56) References Cited

U.S. PATENT DOCUMENTS

| | | | |
|---|---|---|---|
| 4,135,976 A | 1/1979 | Kitajima | |
| 4,155,810 A | 5/1979 | Kitajima et al. | |
| 4,294,703 A * | 10/1981 | Wilms et al. | 210/763 |
| 4,956,098 A * | 9/1990 | Stevens et al. | 210/908 |
| 4,963,596 A | 10/1990 | Lindert et al. | |
| 4,970,264 A | 11/1990 | Lindert et al. | |
| 5,039,770 A | 8/1991 | Lindert et al. | |
| 5,063,089 A | 11/1991 | Lindert et al. | |
| 5,068,299 A | 11/1991 | Lindert et al. | |
| 5,116,912 A | 5/1992 | Lindert et al. | |
| 5,266,410 A | 11/1993 | Lindert et al. | |
| 5,298,289 A | 3/1994 | Lindert et al. | |
| 5,459,066 A | 10/1995 | Mestetsky | |
| 5,609,863 A | 3/1997 | Cox et al. | |
| 5,660,732 A | 8/1997 | Mestetsky | |
| 5,686,014 A | 11/1997 | Baillely et al. | |
| 5,686,297 A | 11/1997 | Mestetsky | |
| 5,716,528 A * | 2/1998 | Jasim et al. | 210/763 |
| 5,807,476 A | 9/1998 | Collins et al. | |
| 5,854,280 A | 12/1998 | Gomez et al. | |
| 5,906,780 A | 5/1999 | Hausdorf et al. | |
| 5,910,275 A | 6/1999 | Hausdorf et al. | |
| 5,952,334 A | 9/1999 | Gomez et al. | |
| 6,106,700 A | 8/2000 | Collins et al. | |
| 6,166,097 A | 12/2000 | Yonemura et al. | |
| 6,262,257 B1 | 7/2001 | Gale et al. | |
| 6,281,258 B1 | 8/2001 | Hausdorf et al. | |
| 6,281,259 B1 | 8/2001 | Hausdorf et al. | |
| 6,380,145 B1 | 4/2002 | Herbots et al. | |
| 6,410,489 B1 | 6/2002 | Zhang et al. | |
| 6,462,011 B1 | 10/2002 | Collins et al. | |
| 6,468,945 B1 | 10/2002 | Zhang | |
| 6,555,012 B1 | 4/2003 | Fernholz et al. | |
| 6,582,605 B2 * | 6/2003 | Krulik et al. | 210/908 |
| 6,630,519 B2 | 10/2003 | Fujimaru et al. | |
| 6,846,439 B2 | 1/2005 | Kadonaga et al. | |
| 6,861,448 B2 | 3/2005 | Brouillette et al. | |
| 6,875,728 B2 | 4/2005 | Gupta et al. | |
| 6,982,241 B2 | 1/2006 | Smith et al. | |
| 6,984,734 B2 | 1/2006 | Sessler et al. | |
| 7,041,819 B2 | 5/2006 | Sessler et al. | |
| 7,122,572 B2 | 10/2006 | Gale et al. | |
| 7,135,289 B2 | 11/2006 | Taylor et al. | |
| 7,175,755 B2 | 2/2007 | de Souza | |
| 7,183,239 B2 | 2/2007 | Smith et al. | |
| 7,205,262 B2 | 4/2007 | Schwartz et al. | |
| 7,220,879 B2 | 5/2007 | Bass et al. | |
| 7,253,279 B1 | 8/2007 | Bass et al. | |
| 7,405,188 B2 | 7/2008 | Chen | |
| 7,465,411 B2 | 12/2008 | Martin | |
| 2002/0193510 A1 | 12/2002 | Kadonaga et al. | |
| 2003/0069319 A1 | 4/2003 | Fujimaru et al. | |
| 2003/0083269 A1 | 5/2003 | Brouillette et al. | |
| 2003/0139482 A1 | 7/2003 | Kadonaga et al. | |
| 2003/0225261 A1 | 12/2003 | Taylor et al. | |
| 2003/0229131 A1 | 12/2003 | Sessler et al. | |
| 2004/0086453 A1 | 5/2004 | Howes | |
| 2004/0222134 A1 | 11/2004 | de Souza | |
| 2004/0234450 A1 | 11/2004 | Howes | |
| 2004/0266634 A1 | 12/2004 | Bockmuhl et al. | |
| 2005/0009929 A1 | 1/2005 | Bockmuhl et al. | |
| 2005/0085402 A1 | 4/2005 | Delcomyn et al. | |
| 2005/0153865 A1 | 7/2005 | Detering et al. | |
| 2005/0164902 A1 | 7/2005 | Man et al. | |
| 2005/0186135 A1 | 8/2005 | Howes | |
| 2005/0256020 A1 | 11/2005 | Gardner et al. | |
| 2005/0256312 A1 | 11/2005 | Osterholt et al. | |
| 2005/0269254 A1 | 12/2005 | Roitman | |
| 2006/0074108 A1 | 4/2006 | Gupta | |
| 2006/0074257 A1 | 4/2006 | Bass et al. | |
| 2006/0128813 A1 | 6/2006 | Weide et al. | |
| 2006/0130702 A1 | 6/2006 | Bockmuehl et al. | |
| 2006/0134239 A1 | 6/2006 | Weide et al. | |
| 2006/0140984 A1 | 6/2006 | Tamarkin et al. | |
| 2006/0247150 A1 | 11/2006 | Molinaro et al. | |
| 2006/0257281 A1 | 11/2006 | Weide et al. | |
| 2006/0293212 A1 | 12/2006 | Griese et al. | |
| 2007/0016102 A1 | 1/2007 | Askin | |
| 2007/0020140 A1 | 1/2007 | Buhr et al. | |
| 2007/0042094 A1 | 2/2007 | Warf et al. | |
| 2007/0048175 A1 | 3/2007 | Tichy et al. | |
| 2007/0078226 A1 | 4/2007 | Schneider et al. | |
| 2007/0101509 A1 | 5/2007 | Huffer et al. | |
| 2007/0107135 A1 | 5/2007 | Huffer et al. | |
| 2007/0155835 A1 | 7/2007 | Weide et al. | |
| 2007/0162999 A1 | 7/2007 | Altier et al. | |
| 2007/0197785 A1 | 8/2007 | Bass et al. | |
| 2007/0207939 A1 | 9/2007 | Fenyvesi et al. | |
| 2007/0219108 A1 | 9/2007 | Martin | |
| 2007/0258996 A1 | 11/2007 | Mookerjee et al. | |
| 2008/0031907 A1 | 2/2008 | Tamarkin et al. | |
| 2008/0041794 A1 | 2/2008 | Shah | |
| 2008/0138293 A1 | 6/2008 | Tamarkin et al. | |
| 2008/0194518 A1 | 8/2008 | Mookerjee et al. | |
| 2008/0194611 A1 | 8/2008 | Alverdy et al. | |
| 2008/0241276 A1 | 10/2008 | Willey et al. | |
| 2008/0272055 A1 | 11/2008 | Klipper et al. | |

OTHER PUBLICATIONS

MSDS for ferrous sulfate, Science Stuff, Inc., 2006.*

* cited by examiner

*Primary Examiner* — Lucas Stelling
(74) *Attorney, Agent, or Firm* — Tumey L.L.P.

(57) ABSTRACT

A method for treating wastewater treats wastewater. In an embodiment, the method for treating wastewater includes treating wastewater comprising a chemical oxygen demand. The method includes dissolving an iron compound in the wastewater. The method also includes adjusting the pH of the wastewater to reduce the chemical oxygen demand of the wastewater.

18 Claims, No Drawings

WASTEWATER TREATMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of wastewater treatment and more specifically to the field of post-decontamination wastewater treatment.

2. Background of the Invention

Vessels in refineries and chemical facilities are decontaminated for various purposes. For instance, vessels may be decontaminated to allow personnel to safely enter the vessels. Different methods have been used to decontaminate vessels. A conventional method includes using washes of aqueous solutions that contain reactive chemicals. The conventional washes typically contain additives having properties of a surfactant to facilitate penetration of oily films and a reactive capability to destroy dangerous sulfides such as hydrogen sulfide and pyrophoric iron sulfides.

Problems involved with such conventional methods include handling the used solution after the decontamination operation has been completed. For instance, after completion of the decontamination operation, the solution may be considered a waste and is typically handled by wastewater facilities at the refinery or chemical facility. In some refineries or chemical facilities, the wastewater facilities are not sufficient to handle such wastewater. Such problems may include limited real estate at the refinery, facility or offshore platform, which may prevent the wastewater facility from being able to handle volumes of wastewater that have organic chemicals. Additional drawbacks include such wastewater having a chemical oxygen demand (COD) greater than that typically desired by conventional facilities.

Consequently, there is a need for an improved method for treating wastewater. Additional needs include an improved method for reducing the chemical oxygen demand of wastewater.

BRIEF SUMMARY OF SOME OF THE PREFERRED EMBODIMENTS

These and other needs in the art are addressed in one embodiment by a method for treating wastewater that includes treating wastewater comprising a chemical oxygen demand. The method includes dissolving an iron compound in the wastewater. The method also includes adjusting the pH of the wastewater to reduce the chemical oxygen demand of the wastewater.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

In an embodiment, a wastewater treatment method includes dissolving an iron compound in the water and then adjusting the pH of the water to reduce the chemical oxygen demand (COD) of the water. COD refers to the amount of oxygen that is consumed under specified conditions in the oxidation of the organic and oxidizable inorganic matter contained in water. In embodiments, the wastewater treatment method reduces the COD of the water to less than about 400 milligrams/liter, alternatively less than about 300 milligrams/liter. In some embodiments, the wastewater treatment method reduces the COD of the water to less than about 100 milligrams/liter, alternatively to less than about 50 milligrams/liter.

The water may include any type of water. In some embodiments, the water is wastewater. In an embodiment, the water is wastewater of an industrial facility. Without limitation, examples of such industrial facilities include refineries, chemical facilities, offshore platforms, and the like. In some embodiments, the water is a post-decontamination wastewater of an industrial facility. The post-decontamination wastewater may be the product of any decontamination process. For instance, the decontamination process may be for benzene or hydrogen sulfide. Without limitation, an example of a decontamination process providing the post-decontamination wastewater is a process using the commercial product ZYME-FLOW for the decontamination. ZYME-FLOW is a water-based surfactant/enzyme combination that is commercially available from United Laboratories International, LLC. In some embodiments, the wastewater comprises dimethylalkylamine-N-oxides. In an embodiment, the alkyl component of the dimethylalkylamine-N-oxides is $C_6$ to $C_{18}$. In some embodiments, the wastewater comprises lauryldimethylamine-N-oxide (LDAO).

The iron compound may be any iron compound suitable for use in reducing the COD of the water. In an embodiment, the iron compound comprises soluble iron salts; insoluble iron salts; solid, hydrated iron compounds; or any combinations thereof. In embodiments, the iron compound comprises soluble iron salts. Any soluble iron salts suitable for reducing the COD may be used. In embodiments, the soluble iron salt comprises soluble ferrous salts, soluble ferric salts, or any combinations thereof. In some embodiments, the soluble iron salts comprise ferrous sulfate, ferric ammonium sulfate, ferrous ammonium sulfate, ferric chloride, ferric sulfate, any soluble ferrous or ferric salts, or any combinations thereof. In an embodiment, the soluble ferrous or ferric salts include nitrates, acetates, and the like. In some embodiments, the soluble ferrous or ferric salts include nitrates, acetates, or any combinations thereof. In embodiments, the soluble iron salt comprises ferric ammonium sulfate, ferrous sulfate, ferrous ammonium sulfate, or any combinations thereof. In an embodiment, the soluble iron salt comprises ferric ammonium sulfate. In embodiments, the iron compound comprises solid, hydrated iron compounds. Any solid, hydrated iron compound suitable for reducing the COD may be used. In an embodiment, the solid, hydrated iron compound comprises solid, hydrated iron oxides. In some embodiments, the solid, hydrated iron compound comprises $Fe_2O_3 \cdot xH_2O$, $FePO \cdot xH_2O$, or any combinations thereof. In other embodiments, the iron compound comprises insoluble iron salts. Any insoluble iron salts suitable for reducing the COD may be used. In an embodiment, the insoluble iron salts comprise $Fe(PO_4)$. Any amount of the iron compound suitable for reducing the COD of the water may be added to the water. In an embodiment, the iron compound is added in amounts from about 1 gram/liter to about 5 grams/liter, alternatively from about 1 gram/liter to about 3 grams/liter. Without being limited by theory, it is to be understood that the amount of the iron compound added to the water may vary depending on the temperature to which the water is heated. For instance, the higher the temperature of the water, the less of the iron compound that may be added. The iron compound is dissolved in the water. In an embodiment, the iron compound is substantially dissolved in the water, alternatively the iron compound is completely dissolved in the water. In embodiments, the iron compound is added to acidic water. Without being limited by theory, the iron compound is added to water with an acidic pH because the iron compound is soluble at the lower pH levels of an acid.

In an embodiment, adjusting the pH of the water involves increasing the pH of the water. The pH is increased to a pH from about 5 to about 9, alternatively from about 6 to about 9, and alternatively from about 7 to about 9. Without being limited by theory, the pH of the water is increased because the iron precipitates near neutral, and the iron catalyzes the destruction of the dimethylalkylamine-N-oxides. For instance, the iron compounds generate Fe ions, which are insoluble at neutral pH and generate hydrated iron oxides (i.e., $Fe(OH)_2 \cdot xH_2O$ or $Fe(OH)_3 \cdot xH_2O$). The pH of the water may be increased by any suitable method. In an embodiment, the pH of the water is increased by addition of any pH increasing chemical that provides a stable pH in the desired range. It is to be understood that a pH increasing chemical that provides a stable pH refers to a chemical that when added provides a desired pH, and, when certain additional amounts are added, the pH is not appreciably changed. In an embodiment, the pH increasing chemical comprises trisodium phosphate, ammonia, sodium bicarbonate, borax, sodium carbonate, or any combination thereof. In some embodiments, the pH increasing material comprises trisodium phosphate, sodium carbonate, sodium bicarbonate, ammonia, or any combinations thereof. In embodiments, the pH increasing material comprises sodium bicarbonate, ammonia, or any combinations thereof. In other embodiments, the pH increasing material comprises sodium bicarbonate, sodium carbonate, or any combinations thereof. In some embodiments, the pH increasing material comprises sodium bicarbonate. In an embodiment, the pH increasing material does not comprise caustic soda. Without being limited by theory, the caustic soda may not allow the wastewater to maintain a stable pH.

The wastewater treatment method may be accomplished at any suitable temperature. In an embodiment, the wastewater is heated to temperatures from about 50° C. to about 100° C., alternatively from about 50° C. to about 90° C., and alternatively from about 50° C. to about 60° C., and alternatively from about 80° C. to about 100° C., and further alternatively about 50° C. In an embodiment, the wastewater is heated to above about 50° C. Without limitation, it is to be understood that longer exposure times may be needed for lower temperatures. In an embodiment, the wastewater treatment method is heated for about 3 hours to about 6 hours, alternatively for about 4 hours to about 6 hours, and further alternatively for about 6 hours.

To further illustrate various illustrative embodiments of the present invention, the following examples are provided.

Example 1

A simulated post-decontamination wastewater was prepared by dissolving 5.00 grams of ZYME-FLOW in 1.00 liter of distilled water. Such solution was then treated with 1.0 gram/liter of ferric ammonium sulfate ($NH_4Fe(SO_4)_2 \cdot 12H_2O$). The treated solution was then split into two equal parts with one part left as it was. The pH of the other part was raised to the range 7-9 with trisodium phosphate. The two parts were then split into several aliquots and treated as in Table I. It was seen that most of the $NH_4Fe(SO_4)_2$ in these samples converted to insoluble $Fe(OH)_3 \cdot xH_2O$ at pH values higher than 4.

TABLE I

| Sample | Treatment | COD |
|---|---|---|
| 1.00 gram/liter $NH_4Fe(SO_4)_2 \cdot 12H_2O$ | 24 hours @ 55° C. | 639 milligrams/liter |
| 1.00 gram/liter $NH_4Fe(SO_4)_2 \cdot 12H_2O$ | 24 hours @ 55° C. | 633 milligrams/liter |
| 1.00 gram/liter $NH_4Fe(SO_4)_2 \cdot 12H_2O$ | 6 hours @ 80° C. | 636 milligrams/liter |
| 1.00 gram/liter $NH_4Fe(SO_4)_2 \cdot 12H_2O$ | 6 hours @ 80° C. | 636 milligrams/liter |
| 1.00 gram/liter $NH_4Fe(SO_4)_2 \cdot 12H_2O$ | 3 hours @ 93° C. | 671 milligrams/liter |
| 1.00 gram/liter $NH_4Fe(SO_4)_2 \cdot 12H_2O$ | 3 hours @ 93° C. | 661 milligrams/liter |
| 1.00 gram/liter $NH_4Fe(SO_4)_2 \cdot 12H_2O$, pH adjusted | 24 hours @ 55° C. | 773 milligrams/liter |
| 1.00 gram/liter $NH_4Fe(SO_4)_2 \cdot 12H_2O$, pH adjusted | 24 hours @ 55° C. | 732 milligrams/liter |
| 1.00 gram/liter $NH_4Fe(SO_4)_2 \cdot 12H_2O$, pH adjusted | 6 hours @ 80° C. | 171 milligram/liter |
| 1.00 gram/liter $NH_4Fe(SO_4)_2 \cdot 12H_2O$, pH adjusted | 6 hours @ 80° C. | 188 milligram/liter |
| 1.00 gram/liter $NH_4Fe(SO_4)_2 \cdot 12H_2O$, pH adjusted | 3 hours @ 93° C. | 136 milligrams/liter |
| 1.00 gram/liter $NH_4Fe(SO_4)_2 \cdot 12H_2O$, pH adjusted | 3 hours @ 93° C. | 136 milligrams/liter |
| 0.50% ZYME-FLOW | Untreated | 1,090 milligrams/liter |
| 0.50% ZYME-FLOW | Untreated | 927 milligrams/liter |

As shown in Table I, the treatment of a 0.50% ZYME-FLOW wastewater with the ferric ammonium sulfate greatly reduced the COD in all samples. In addition, by raising the pH of the wastewater to neutral values and exposing it to temperatures in the range from 80° C.-93° C. for several hours, the COD of this wastewater was reduced to values well below the 300 milligrams/liter limit preferred in the refinery industry.

Example 2

A solution of water containing 5.0 grams/liter of ZYME-FLOW was prepared. A portion of this solution was saved, and the other portions treated in aliquots with soluble iron sulfate salts, iron (II) sulfate and iron (III) ammonium sulfate. Treatment of the 0.50% ZYME-FLOW solution by either of these two iron sulfate salts resulted in a low pH (2-3), at which all $Fe^{++}$ was soluble and most $Fe^{+++}$ was soluble. Some of the samples were further treated to raise pH into the range 7-9 to generate the hydrated iron oxides. Trisodium phosphate was used to increase the pH. After the treatment with these iron salts (and the pH-adjusting trisodium phosphate where noted in Table II as pH adjusted), the samples were heated at 55° C., 80° C., and 93° C. with intermittent agitation for arbitrarily selected durations.

After cooling of the samples, all samples were filtered to remove hydrated iron oxides, and, thereby, the samples were stabilized. All filtered samples were analyzed in duplicate for COD by the Dichromate Reflux Method. The procedure for the Dichromate Reflux Method may be found in the Hach DR/2010 Manual, pages 609-610, which is incorporated by reference herein in its entirety.

TABLE II

| Sample | Treatment | COD |
|---|---|---|
| 0.50% ZYME-FLOW | Untreated | 1,090 milligrams/liter |
| 0.50% ZYME-FLOW | Untreated | 927 milligrams/liter |
| 0.67 grams/liter $FeSO_4 \cdot 7H_2O$ | 6 hours @ 80° C. | 319 milligrams/liter |
| 0.67 grams/liter $FeSO_4 \cdot 7H_2O$ | 6 hours @ 80° C. | 306 milligrams/liter |
| 0.67 grams/liter $FeSO_4 \cdot 7H_2O$, pH adjusted | 6 hours @ 80° C. | 92 milligrams/liter |
| 0.67 grams/liter $FeSO_4 \cdot 7H_2O$, pH adjusted | 6 hours @ 80° C. | 86 milligrams/liter |
| 1.00 gram/liter $NH_4Fe(SO_4)_2 \cdot 12H_2O$ | 24 hours @ 55° C. | 639 milligrams/liter |
| 1.00 gram/liter $NH_4Fe(SO_4)_2 \cdot 12H_2O$ | 24 hours @ 55° C. | 633 milligrams/liter |
| 1.00 gram/liter $NH_4Fe(SO_4)_2 \cdot 12H_2O$ | 6 hours @ 80° C. | 636 milligrams/liter |
| 1.00 gram/liter $NH_4Fe(SO_4)_2 \cdot 12H_2O$ | 6 hours @ 80° C. | 636 milligrams/liter |
| 1.00 gram/liter $NH_4Fe(SO_4)_2 \cdot 12H_2O$ | 3 hours @ 93° C. | 671 milligrams/liter |
| 1.00 gram/liter $NH_4Fe(SO_4)_2 \cdot 12H_2O$ | 3 hours @ 93° C. | 661 milligrams/liter |
| 1.00 gram/liter $NH_4Fe(SO_4)_2 \cdot 12H_2O$, pH adjusted | 24 hours @ 55° C. | 773 milligrams/liter |
| 1.00 gram/liter $NH_4Fe(SO_4)_2 \cdot 12H_2O$, pH adjusted | 24 hours @ 55° C. | 772 milligrams/liter |
| 1.00 gram/liter $NH_4Fe(SO_4)_2 \cdot 12H_2O$, pH adjusted | 6 hours @ 80° C. | 171 milligrams/liter |
| 1.00 gram/liter $NH_4Fe(SO_4)_2 \cdot 12H_2O$, pH adjusted | 6 hours @ 80° C. | 188 milligrams/liter |
| 1.00 gram/liter $NH_4Fe(SO_4)_2 \cdot 12H_2O$, pH adjusted | 3 hours @ 93° C. | 136 milligrams/liter |
| 1.00 gram/liter $NH_4Fe(SO_4)_2 \cdot 12H_2O$, pH adjusted | 3 hours @ 93° C. | 136 milligrams/liter |

From an examination of the results of Table II, it was clear that soluble iron salts do not have a sufficient effect on destroying lauryldimethylamine-N-oxide (LDAO) and reducing the COD of ZYME-FLOW wastes to <300 milligrams/liter. However, by converting soluble iron to hydrated iron oxides ($Fe_2O_3 \cdot xH_2O$ or $FeO \cdot xH_2O$) through the expedient of pH adjustment, the elimination of LDAO and consequent lowering of COD to <300 milligrams/liter was possible. Another conclusion from the above Table II was that a 24-hour exposure at 55° C. was either ineffective or only marginally effective. It appeared that either a higher temperature or a longer exposure time was required.

Having demonstrated that hydrated iron oxides, generated in-situ by pH elevation, catalyzed the decomposition of LDAO and satisfactorily reduced COD of a ZYME-FLOW waste, we determined what effect already-manufactured, insoluble iron compounds had on COD reduction. Two anhydrous compounds and two hydrated compounds were chosen, which compounds included reagent grade $Fe_2O_3$ (<5 microns), $Fe_3O_4$ (<5 microns), $FePO_4 \cdot 4H_2O$ and $Fe_2O_3 \cdot xH_2O$ ("rust").

In all cases, 1.0 gram of the solid compound per liter of simulated waste was used. All tests were heated at 95° C. for four hours with intermittent stirring. The results of the tests are shown below in Table III.

TABLE III

| Sample | Treatment | COD |
|---|---|---|
| $Fe_3O_4$ | 4 hours @ 95° C. | 679 milligram/liter |
| $Fe_3O_4$ | 4 hours @ 95° C. | 697 milligrams/liter |
| $Fe_2O_3$ | 4 hours @ 95° C. | 752 milligrams/liter |
| $Fe_2O_3$ | 4 hours @ 95° C. | 756 milligrams/liter |
| $FePO_3 \cdot 4H_2O$ | 4 hours @ 95° C. | 245 milligrams/liter |
| $FePO_3 \cdot 4H_2O$ | 4 hours @ 95° C. | 248 milligrams/liter |
| $Fe_2O_3 \cdot xH_2O$ | 4 hours @ 95° C. | 290 milligrams/liter |
| $Fe_2O_3 \cdot xH_2O$ | 4 hours @ 95° C. | 295 milligrams/liter |

In addition to the LDAO component, ZYME-FLOW also contained an enzyme cocktail. These enzymes were not decomposed by exposure to hydrated iron compounds and contributed to COD. Further, the destruction of LDAO in aqueous solution generated the corresponding tertiary amine, lauryldimethylamine. The material was sparingly soluble in water, and its presence contributed to COD. However, these two complications did not prevent the reduction of COD to a level previously established as <300 milligrams/liter.

Example 3

A 1% stock ZYME-FLOW solution was prepared by dissolving 10.0 grams of the ZYME-FLOW concentrate in 1.0 liter of distilled water. This stock was analyzed as-is for COD. The analyzed values averaged out to 1,368 milligrams/liter.

This stock was diluted 1:2 in order to simulate a 0.50% waste of ZYME-FLOW. 100 milliliter samples were prepared for testing from this wastewater. Varying weights of ferrous sulfate hydrate ($FeSO_4 \cdot 7H_2O$) were dissolved in these samples, followed by addition of sufficient 30% aqua ammonia to raise initial pH to the range of about 5-6. The amount of aqua ammonia was about 0.2 milliliters. The solutions were heated to 50° C., and the exposure time was 6 hours. Treatment levels and the results are shown below in Table IV.

TABLE IV

| $FeSO_4 \cdot 7H_2O$ Added | Final COD |
|---|---|
| 0.0% | 697 milligrams/liter |
| 0.1% | 647 milligrams/liter |
| 0.3% | 100 milligrams/liter |
| 0.5% | 15 milligrams/liter |
| 1.0% | 25 milligrams/liter |

From the conclusions, the treatment may start at a pH of about 5-6. Without limitation, $Fe^{++}$ was soluble at this pH, so the dissolved iron may have permeated the complete solution. Slowly, this soluble $Fe^{++}$ was oxidized by the dimethyldodecylamine-N-oxide present, and, at pH of about 6, the resulting $Fe^{++}$ fell out of solution as the hydrated oxide. This suspension of $Fe_2O_3 \cdot xH_2O$ further catalyzed the degradation of dimethyldodecylamine-N-oxide.

Example 4

A 0.50% stock ZYME-FLOW solution (wastewater) was prepared by dissolving 5.0 grams of the ZYME-FLOW concentrate in 1.0 liter of distilled water. This 0.50% ZYME-FLOW wastewater was analyzed to contain about 700 parts per million COD.

A 100 milliliter sample was prepared for testing from this wastewater. 1.0 gram of ferrous sulfate hydrate ($FeSO_4 \cdot 7H_2O$) was dissolved in the wastewater. 0.24 grams of $NaHCO_3$ was then added to the wastewater to elevate the pH to the range 6-7. After stirring thoroughly, the sample was set in a 50° C. bath for 6 hours.

After this exposure, the wastewater was analyzed for COD by the procedure in Method 8000 of the Hach DR/2010 Handbook (Dichromate Method), which is incorporated by reference herein in its entirety. The analysis showed that the treated wastewater had a COD of 49 milligrams/liter.

While compositions and methods are described in terms of "comprising," "having," "containing," or "including" various components or steps, the compositions and methods can also "consist essentially of" or "consist of" various components and steps.

Although the present invention and its advantages have been described in detail, it should be understood that various changes, substitutions and alterations may be made herein without departing from the spirit and scope of the invention as defined by the appended claims.

What is claimed is:

1. A method for treating wastewater, wherein the wastewater comprises a chemical oxygen demand, comprising:
   (A) dissolving an iron compound in the wastewater, the wastewater comprising dimethylalkylamine-N-oxide;
   (B) adjusting the pH of the wastewater to precipitate an insoluble iron composition comprising hydrated iron oxides; and
   (C) reacting the iron composition with the dimethylalkylamine-N-oxide in the wastewater to reduce the chemical oxygen demand of the wastewater and provide a reduced chemical oxygen demand wastewater.

2. The method of claim 1, further comprising reducing the chemical oxygen demand of the reduced chemical oxygen wastewater to less than about 300 milligrams/liter.

3. The method of claim 1, further comprising reducing the chemical oxygen demand of the reduced chemical oxygen wastewater to less than about 100 milligrams/liter.

4. The method of claim 1, further comprising reducing the chemical oxygen demand of the reduced chemical oxygen demand wastewater to less than about 50 milligrams/liter.

5. The method of claim 1, wherein the dimethylalkylamine-N-oxide comprises an alkyl component, and wherein the alkyl component comprises $C_6$ to $C_{18}$.

6. The method of claim 1, wherein the iron compound comprises a soluble iron salt.

7. The method of claim 1, wherein the iron compound comprises ferrous sulfate, ferric ammonium sulfate, ferrous ammonium sulfate, ferric chloride, ferric sulfate, a soluble ferrous salt, a soluble ferric salt, or any combinations thereof.

8. The method of claim 1, wherein the iron compound comprises ferric ammonium sulfate.

9. The method of claim 1, further comprising adding from about 1 gram/liter to about 5 grams/liter of the iron compound to the wastewater.

10. The method of claim 1, wherein the iron compound comprises a soluble ferrous salt, a soluble ferric salt, or any combinations thereof.

11. The method of claim 1, wherein adjusting the pH comprises increasing the pH of the wastewater to a pH from about 5 to about 9.

12. The method of claim 1, wherein adjusting the pH comprises increasing the pH of the wastewater to a pH from about 7 to about 9.

13. The method of claim 1, wherein adjusting the pH comprises adding trisodium phosphate, ammonia, sodium bicarbonate, borax, sodium carbonate, or any combination thereof to the wastewater.

14. The method of claim 1, wherein adjusting the pH comprises adding sodium bicarbonate to the wastewater.

15. The method of claim 1, further comprising heating the wastewater.

16. The method of claim 15, wherein heating the wastewater comprises heating the wastewater to temperatures from about 50° C. to about 100° C.

17. The method of claim 15, wherein heating the wastewater comprises heating the wastewater to temperatures from about 50° C. to about 60° C.

18. The method of claim 15, wherein heating the wastewater comprises adding heat for about 3 hours to about 6 hours.

* * * * *